US009798820B1

(12) United States Patent
Prémont-Schwarz et al.

(10) Patent No.: US 9,798,820 B1
(45) Date of Patent: Oct. 24, 2017

(54) CLASSIFICATION OF KEYWORDS

(71) Applicant: Searchmetrics GmbH, Berlin (DE)

(72) Inventors: Isabeau Prémont-Schwarz, Helsinki (FI); Abhishek Thakur, Berlin (DE); Marcus Tober, Berlin (DE)

(73) Assignee: Searchmetrics GmbH, Berlin (DE)

( * ) Notice: Subject to any disclaimer, the term of this patent is extended or adjusted under 35 U.S.C. 154(b) by 0 days.

(21) Appl. No.: 15/337,322

(22) Filed: Oct. 28, 2016

(51) Int. Cl.
*G06F 7/00* (2006.01)
*G06F 17/30* (2006.01)

(52) U.S. Cl.
CPC .... *G06F 17/30867* (2013.01); *G06F 17/3069* (2013.01); *G06F 17/30705* (2013.01)

(58) Field of Classification Search
CPC ......... G06F 17/30029; G06F 17/30864; G06F 17/3069; G06F 17/30867; G06F 17/30705
USPC .......................... 707/706, 710, 722, 737, 749
See application file for complete search history.

(56) References Cited

U.S. PATENT DOCUMENTS

| 8,041,733 | B2 | 10/2011 | Rouhani-Kalleh |
| 8,768,960 | B2 | 7/2014 | Hu et al. |
| 9,311,386 | B1* | 4/2016 | Song ................ G06F 17/30722 |
| 2003/0128236 | A1* | 7/2003 | Chen ................ G06F 17/30902 |
| | | | 715/745 |
| 2016/0156580 | A1* | 6/2016 | Krka ...................... H04L 51/14 |
| | | | 709/206 |

FOREIGN PATENT DOCUMENTS

CN            104424296 A           3/2015

* cited by examiner

*Primary Examiner* — Md. I Uddin
(74) *Attorney, Agent, or Firm* — Millen, White, Zelano & Branigan, P.C.; William F. Nixon

(57) ABSTRACT

A computer-implemented method of classifying a keyword in a network comprises: identifying a plurality of candidate categories, comprising: converting a plurality of search results related to the keyword into a plurality of search vectors, wherein each of the plurality of search results indicates a related resource in the network; converting a plurality of resources into a plurality of category vectors, wherein each of the plurality of resources is classified in one or more categories of a set of categories; and determining, for the plurality of category vectors, a plurality of similarity values indicating similarity to the plurality of search vectors; processing the plurality of candidate categories; and classifying the keyword by selecting the candidate category having a highest similarity value within the plurality of similarity values, a corresponding system, computing device and non-transitory computer-readable storage medium.

20 Claims, 14 Drawing Sheets

CLASSIFICATION OF KEYWORDS

BACKGROUND OF THE INVENTION

Field of the Invention

The invention relates to a method, system, computing device and storage medium for classifying keywords, i.e. tagging or labelling keywords with categories. More specifically, the invention relates to a method, system, computing device and storage medium for classifying keywords for resources in a network.

Background of the Invention

The World-Wide Web (www) comprises an indefinite number of webpages. Search engines crawl the webpages via the Internet and return, for user convenience, a list of webpages relevant to any particular search term, i.e. one or more keywords. Operators aiming to promote their webpages onto these lists of webpages create and optimize, using various techniques, their webpages for the search engines (search engine optimization, SEO). Recently, access to and usage of the World-Wide Web has moved from stationary personal computers to mobile computing devices, which adds another layer of complexity to search engine optimization.

Owing to the indefinite number of webpages and their ever changing contents, it is increasingly difficult to understand and match the users' search intention and/or buying cycle for a particular search query, and to get resources highly ranked by search engines in organic search results for relevant keywords.

The present invention overcomes present limitations and provides other advantages, as will become clearer to those skilled in the art from the present description.

BRIEF SUMMARY OF THE INVENTION

According to an aspect of an embodiment, a computer-implemented method of classifying a keyword in a network may comprise: with a classification module, executing on one or more computing devices, automatically: identifying a plurality of candidate categories, comprising: converting a plurality of search results related to the keyword into a plurality of search vectors, wherein each of the plurality of search results may indicate a related resource in the network; converting a plurality of resources into a plurality of category vectors, wherein each of the plurality of resources may be classified in one or more categories of a set of categories; and determining, for the plurality of category vectors, a plurality of similarity values indicating similarity to the plurality of search vectors; processing the plurality of candidate categories; and classifying the keyword by selecting the candidate category having a highest similarity value within the plurality of similarity values.

According to an aspect of another embodiment, in a method, identifying the plurality of candidate categories may comprise: extracting, for each of the plurality of search results or plurality of resources, one or more terms relevant to the related resource; removing, for each of the plurality of search results or plurality of resources, one or more terms irrelevant to the related resource; producing word embeddings using a Word2Vec model, such as continuous bag-of-words model or continuous skip-gram model; reducing dimensionality of the vectors of the plurality of search vectors or resource vectors using nonlinear dimensionality reduction or t-distributed stochastic neighbor embedding; or selecting, for the plurality of search result, a pre-determined number of search results or per search result, a pre-determined number of candidate categories having higher similarity values within the plurality of similarity values.

According to an aspect of another embodiment, in a method, determining the plurality of similarity values may comprise: determining cosine similarities between each of the plurality of category vectors and each of the plurality of search vectors.

According to an aspect of another embodiment, in a method, the plurality of categories may comprise: related categories; and processing the plurality of candidate categories may comprises, in case that a candidate category is a descendant category of another candidate category, transferring its similarity value to the other candidate category; or, in case that two or more candidate categories share a common ancestor category, transferring their similarity values to their common ancestor category.

According to an aspect of another embodiment, in a method, classifying the keyword may comprise: determining cosine similarity between the candidate category and the keyword; or using long short-term memory.

According to an aspect of another embodiment, a method may further comprise: with a category module, executing on one or more computing devices, automatically: obtaining the set of categories; and storing the set of categories.

According to an aspect of another embodiment, in a method, the set of categories may be a partially ordered set.

According to an aspect of another embodiment, a method may further comprise: with a resource contents module, executing on one or more computing devices, automatically: obtaining the plurality of resources; and storing the plurality of resources.

According to an aspect of another embodiment, in a method, each of the plurality of resources may comprise: a resource title; and a resource corpus.

According to an aspect of another embodiment, a method may further comprise: with a search results module, executing on one or more computing devices, automatically: obtaining, from the network, pluralities of search results, wherein each of the pluralities of search results may be related to one of a plurality of keywords, and each search result of the pluralities of search results indicates a related resource in the network; and storing the pluralities of search results; wherein the keyword may be one of the plurality of keywords; and the plurality of search results may be one of the pluralities of search results.

According to an aspect of another embodiment, in a method, obtaining the pluralities of search results may comprise: extracting, for each of the pluralities of search results, a plurality of most relevant organic search results; extracting, for each search result of the pluralities of search results, one or more terms relevant to the related resource; or removing, for each search result of the pluralities of search results, one or more terms irrelevant to the related resource.

According to an aspect of another embodiment, in a method, each search result of the pluralities of search results may comprise: a search result title.

According to an aspect of yet another embodiment, a system for classifying a keyword may comprise: one or more processors, when executing on one or more computing devices, being suitable for performing operation, and the operations may comprise: identifying a plurality of candidate categories, comprising: converting a plurality of search results related to the keyword into a plurality of search vectors, wherein each of the plurality of search results may indicate a related resource in the network; converting a plurality of resources into a plurality of category vectors, wherein each of the plurality of resources may be classified in one or more categories of a set of categories; and determining, for the plurality of category vectors, a plurality of similarity values indicating similarity to the plurality of search vectors; processing the plurality of candidate categories; and classifying the keyword by selecting the candidate category having a highest similarity value within the plurality of similarity values.

According to an aspect of yet another embodiment, a computing device for classifying a keyword may comprise: one or more processors, configured to perform operations; and a memory, coupled to the one or more processors and comprising instructions to cause, when executing on the one or more processors, the computing device to perform operations, comprising: identifying a plurality of candidate categories, comprising: converting a plurality of search results related to the keyword into a plurality of search vectors, wherein each of the plurality of search results may indicate a related resource in the network; converting a plurality of resources into a plurality of category vectors, wherein each of the plurality of resources may be classified in one or more categories of a set of categories; and determining, for the plurality of category vectors, a plurality of similarity values indicating similarity to the plurality of search vectors; processing the plurality of candidate categories; and classifying the keyword by selecting the candidate category having a highest similarity value within the plurality of similarity values.

According to an aspect of another embodiment, in a computing device, the memory may further comprise instructions to cause the computing device, when identifying the plurality of candidate categories, to perform further operations, comprising: extracting, for each of the plurality of search results or plurality of resources, one or more terms relevant to the related resource; removing, for each of the plurality of search results or plurality of resources, one or more terms irrelevant to the related resource; producing word embeddings using a Word2Vec model, such as continuous bag-of-words model or continuous skip-gram model; reducing dimensionality of the vectors of the plurality of search vectors or resource vectors using nonlinear dimensionality reduction or t-distributed stochastic neighbor embedding; or selecting, for the plurality of search result, a pre-determined number of search results or per search result, a pre-determined number of candidate categories having higher similarity values within the plurality of similarity values.

According to an aspect of another embodiment, in a computing device, the memory may further comprise instructions to cause the computing device, when determining the plurality of similarity values, to perform further operations, comprising: determining cosine similarities between each of the plurality of category vectors and each of the plurality of search vectors.

According to an aspect of another embodiment, in a computing device, the plurality of categories may comprise related categories; and the memory further comprises instructions to cause the computing device, when processing the plurality of candidate categories, to perform further operations, comprising: in case that a candidate category is a descendant category of another candidate category, transferring its similarity value to the other candidate category; or in case that two or more candidate categories share a common ancestor category, transferring their similarity values to their common ancestor category.

According to an aspect of another embodiment, in a computing device, the memory may further comprise instructions to cause the computing device, when classifying the keyword, to perform further operations, comprising: determining cosine similarity between the candidate category and the keyword; or using long short-term memory.

According to an aspect of another embodiment, in a computing device, the memory may further comprise instructions to cause the computing device to perform further operations, comprising: obtaining the set of categories; and storing the set of categories.

According to an aspect of another embodiment, in a computing device, the set of categories may be a partially ordered set.

According to an aspect of another embodiment, in a computing device, the memory may further comprise instructions to cause the computing device to perform further operations, comprising: obtaining the plurality of resources; and storing the plurality of resources.

According to an aspect of another embodiment, in a computing device, each of the plurality of resources may comprise: a resource title; and a resource corpus.

According to an aspect of another embodiment, in a computing device, the memory may further comprise instructions to cause the computing device to perform further operations, comprising: obtaining, from the network, pluralities of search results, wherein each of the pluralities of search results may be related to one of a plurality of keywords, and each search result of the pluralities of search results indicates a related resource in the network; and storing the pluralities of search results; wherein the keyword may be one of the plurality of keywords; and the plurality of search results is one of the pluralities of search results.

According to an aspect of another embodiment, in a computing device, the memory may further comprise instructions to cause the computing device, when obtaining the pluralities of search results, to perform further operations, comprising: extracting, for each of the pluralities of search results, a plurality of most relevant organic search results; extracting, for each search result of the pluralities of search results, one or more terms relevant to the related resource; or removing, for each search result of the pluralities of search results, one or more terms irrelevant to the related resource.

According to an aspect of another embodiment, in a computing device, each search result of the pluralities of search results may comprise: a search result title.

According to an aspect of yet another embodiment, a non-transitory computer-readable storage medium may comprise instructions causing a system to perform operations for classifying a keyword, and the operations may comprise: identifying a plurality of candidate categories, comprising: converting a plurality of search results related to the keyword into a plurality of search vectors, wherein each of the plurality of search results may indicate a related resource in the network; converting a plurality of resources into a plurality of category vectors, wherein each of the plurality of resources may be classified in one or more categories of a set of categories; and determining, for the plurality of category vectors, a plurality of similarity values indicating similarity to the plurality of search vectors; processing the plurality of candidate categories; and classifying the keyword by selecting the candidate category having a highest similarity value within the plurality of similarity values.

Classifying keywords and search queries are challenges particular to the Internet. The present invention can enable a user, for example an operator of a large number of resources such as webpages, to control classification of keywords and search queries. Thus, the present invention can enable the user to cope with the classification of the keywords and search queries although technical, administrative or financial means may be limited. Further, the present invention can enable the user to concentrate on particular keywords and search queries within a large body of keywords and search queries having best prospects. Furthermore, the present invention can enable the user to save time and/or to reduce costs.

The object and advantages of the embodiments will be realized and achieved at least by steps, elements, features and combinations defined in the claims. Thus, this brief summary and the following detailed description are exemplary and explanatory, and are not restrictive of the invention as defined in the claims.

BRIEF DESCRIPTION OF THE SEVERAL VIEWS OF THE DRAWING

The enclosed drawing depicts various aspects of some embodiments, and is not restrictive of the invention as defined in the claims:

DETAILED DESCRIPTION OF THE INVENTION

Figure 1:
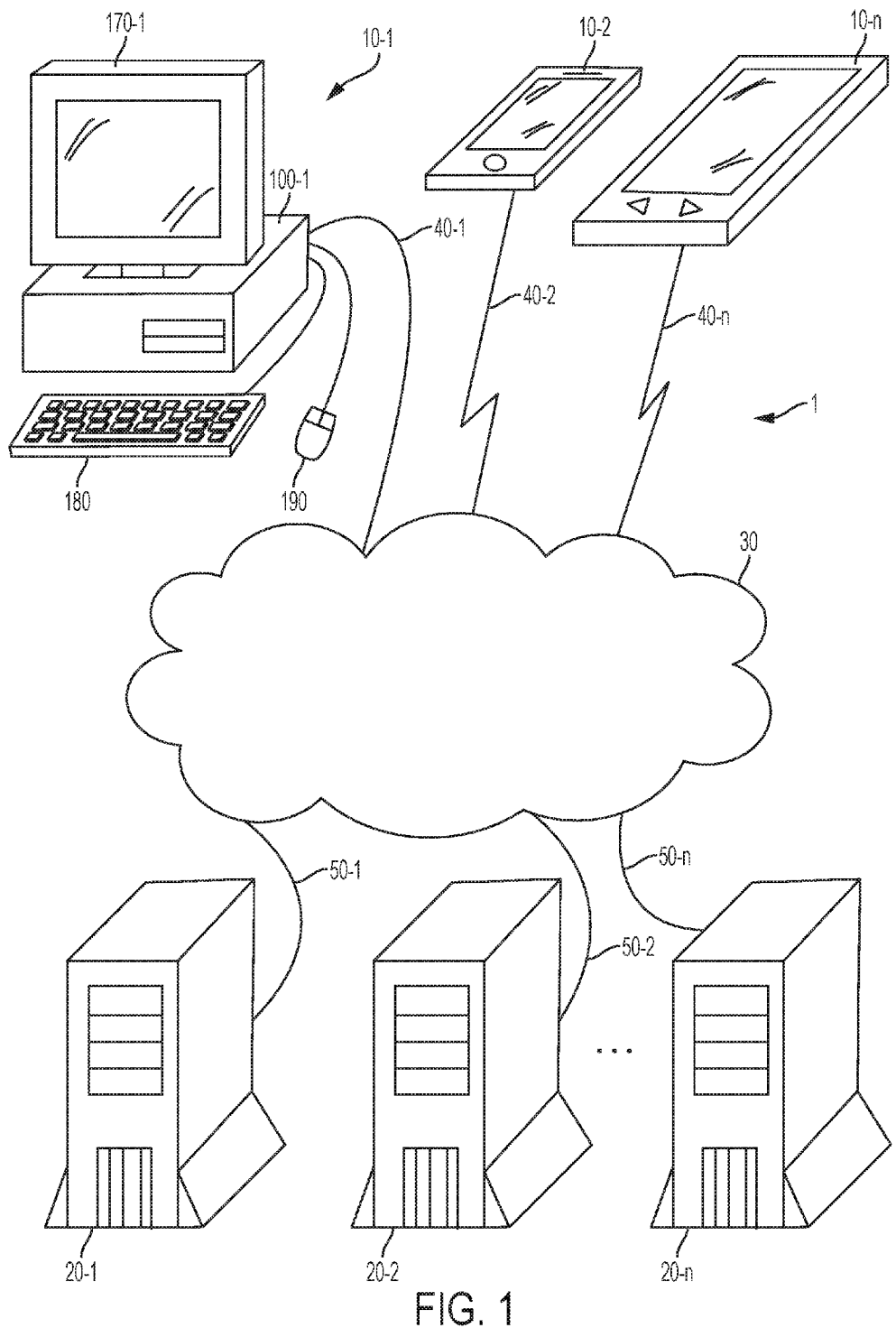
FIG. 1 shows a typical computer network architecture 1 implementing the present invention.

A preferred embodiment of the invention is now described in detail. Referring to the drawing, like reference numbers indicate like parts throughout the views. The drawing shows diagrammatic and schematic representations of some embodiments, is not necessarily drawn to scale, and is not restrictive of the invention. As used in the description and claims, the meaning of "a", "an" and "the" includes plural reference unless the context clearly dictates otherwise.

As used herein, the term "computer network" generally refers to a plurality of interconnected computing devices such as desktop computers, laptop computers, mobile devices like tablet computers, smart phones and smart watches, and servers, interconnected directly or, via network devices such as hubs, routers, switches and gateways, indirectly, for example the Internet. The computer network may comprise wire-based or wireless connections, or both.

As used herein, the term "resource" generally refers to an information source, for example a document such as a static document like hypertext markup language (html) document or dynamically generated document like PHP: Hypertext Preprocessor (php) document, or a software application, such as a software application for a mobile device (mobile app, app), located in one or more computing devices and being accessible, using an identifier of the resource, via the computer network. The term "target resource" generally refers to a resource under test, whereas the term "field resource" generally refers to a resource serving as reference.

As used herein, the term "universal resource locator (URL)" generally refers to an identifier to the resource, specifying its location on the computer network and a mechanism for retrieving it.

As used herein, the term "page" generally refers to a single-page resource. Pages may have different lengths.

As used herein, the term "webpage" generally refers to a page in the World-Wide Web (www).

As used herein, the term "resource contents" generally refers to contents of a resource. The contents may comprise a resource title and a resource corpus. The contents may be comprised of at least one of textual contents, graphical contents, imagery contents, audio contents, and video contents, for example. The resource contents may be intended for a particular market. The market may be defined by a given country and/or given language.

As used herein, the term "site" generally refers a plurality of pages accessible via a common domain or subdomain name. Sites are typically operated by companies, governments, organizations, and private individuals, for example. The term target site generally refers to a site under test, whereas the term field site generally refers to a site serving as reference.

As used herein, the term "website" generally refers to a site in the World-Wide Web.

As used herein, the term "network" generally refers to a plurality of resources made available to users via a computer network. The World-Wide Web, for example, is a network.

As used herein, the term "natural language" refers generally to a human written or spoken language, as opposed to a computer language, and/or more specifically to a language evolving naturally as a means of communication among people, as opposed to an artificial language or a formal language.

As used herein, the term "question word" generally refers to a word introducing a group of words, such as a sentence, in an interrogative form, addressed to someone or something in order to get information in reply. Questions words comprise, in English, "what", "when", "where", "why", "who", "whose", "which", "how", "how much" and "how many", and in German "was", "wann", "wo", "wohin", "warum", "wer", "wessen", "welche", "welcher", "welches", "wie", "wieviel" and "wieviele", for example.

As used herein, the term "keyword" generally refers to a term capturing the essence of a topic of interest or topic of a resource. The keyword may, for example, comprise a word or compound word. The term "commercial keyword" generally refers to a type of keyword having a high probability of bringing prospect customers to a page or site. The term "transactional keyword" generally refers to a type of keyword, like "buy" and "subscribe", having a high probability of bringing determined customers to a page or site. Based on user intention, transactional keywords may be further classified into subcategories, or "buying cycle categories", comprising "awareness", "consideration" (or "evaluation"), purchase (or "decision") and "retention". The term "informational keyword" generally refers to a type of keyword, like a question word such as "what" or "how", indicating search for information and having a low probability of generating revenue. The term "navigational keyword" generally refers to a type of keyword, like a company or brand name, indicating a navigational search for merely finding the page or site of this company or product.

As used herein, the term "topic cluster" generally refers to a cluster of similar keywords. The name of a topic cluster may result from the most frequent keyword in a cluster of similar keywords.

As used herein, the term "topic graph" refers to a representation, wherein each topic is represented by a node comprising one or more properties of the topic.

As used herein, the term "category" generally refers to a class or group of similar or related items such as resources or keywords relating to a particular topic. A set of categories comprises a plurality of categories. The set of categories may be a partially ordered set (poset) or graph such as tree. The tree may have a plurality of related categories, one of which being a root category. Any category including the root category may have one or more child categories, or subcategories, and, thus, be designated "parent category". If its one or more child categories have one or more child categories themselves, it may also be designated "ancestor category". Any category excluding the root category may have one or more parent categories and, thus, be designated "child category". If its one or more parent categories have one or more parent categories themselves, it may also be designated "descendent category". Categories having the same parent category may be designated "sibling categories". Any resource or keyword may be placed in one or more categories comprising resources or keywords relating to the same topic. The free online encyclopedia Wikipedia.org, enabling its users to contribute and consume information, and further Wikimedia projects use the free collaboratively edited knowledge base Wikidata.org as a common source of data. In Wikipedia, articles are placed in one or more categories, and all categories are organized as overlapping trees, formed by creating links between inter-related categories.

As used herein, the term "term frequency—inverse document frequency", or "tf-idf" for short, is a numerical statistic intended to reflect importance of a particular term in a corpus of text or collection of documents. It is a function, such a product, of two statistics: term frequency and inverse document frequency: The term "term frequency" (tf) refers to the number of occurrences of the particular term in a document; wherein the weight of the term in a particular document is proportional to its term frequency. The term "inverse document frequency" (idf) refers an inverse of the number of all documents wherein the particular term occurs, thus, quantifying specificity of the term: wherein weights of very frequently occurring terms such as common terms, for example "a", "the", "is" and "and", are diminished, and, thus, weights of rarely occurring terms are increased.

As used herein, the term "Word2Vec" generally refers to distinct models, comprising the continuous bag-of-words (CBOW) model and the continuous skip-gram model, for producing word embeddings in natural language processing (NLP) by taking a large corpus of text as input and producing a high-dimensional space wherein each unique word in the corpus is assigned to a corresponding word vector in the space. The word vectors are positioned in the space such that words that share common contexts in the corpus are located in close proximity to one another in the space. The models may be implemented by shallow, two-layer neural networks trained to reconstruct linguistic contexts of words.

As used herein, the term "t-distributed stochastic neighbor embedding", or t-SNE for short, generally refers to algorithms for nonlinear dimensionality reduction, or dimension reduction, by reducing a number of variables under consideration via obtaining a set of principal variables. The algorithms may be used for embedding high-dimensional data into a two-dimensional or three-dimensional space, and visualizing the data in a scatter plot.

As used herein, the term "cosine similarity" refers to a measure of similarity between two non-zero vectors of an inner-product space that measures the cosine of the angle between the vectors. For an angle of 0° the cosine is 1, and for any other angle it is less than 1. Thus, it is a judgment of orientation and not magnitude: two vectors with the same orientation have a cosine similarity of 1, two vectors at 90° have a similarity of 0, and two vectors diametrically opposed have a similarity of −1, independent of their magnitudes.

As used herein, the term "long short-term memory", or "LSTM" for short, refers is a particular recurrent neural network (RNN) architecture. Like most RNNs, an LSTM may, given enough network units and a proper weight matrix, compute anything a conventional computer can compute. However, unlike traditional RNNs, an LSTM may be well-suited to learn from experience for classifying, processing and predicting time series with very long time lags of unknown size between important events.

As used herein, the term "organic search" generally refers to searching, in response to a query comprising one or more keywords (keyword query), relevant information. A search usually comprises adding attribution information, then filtering it, and then sorting it. Search algorithms comprise the CheiRank (sorting) algorithm and PageRank (sorting) algorithm. Search algorithms may analyse and/or exploit user behavior, for example length of stay on and return rate from a search result. The results of the organic search are generally ranked by relevance to the query.

As used herein, the term "search engine" generally refers to a software application for searching information on a network using organic search. Search engines include Google.com, Baidu.com and Yandex.com.

As used herein, the term "crawler" generally refers to a software application executable on a computing device for systematically browsing a network, typically for indexing sites for a search engine.

As used herein, the term "browser" generally refers to a software application executable on a computing device for enabling a computer user to navigate, or surf, a network.

As used herein, the term "search engine results page(s) (SERP(s))" generally refers to one or more pages generated by a search engine in response to a query received from a user via a computing device, returned to the computer device and displaying the ranked results in a browser on the computing device. In addition to results of the organic search, the pages typically further comprise sponsored results, i.e. advertisements relating to the query and paid for by advertisers (keyword advertising).

As used herein, the term "search engine marketing (SEM)" generally refers to marketing on search engine results pages, like keyword advertising.

As used herein, the term "conversion" generally refers to a user decision resulting in an operator-intended or marketing-intended action, such as a transaction, e.g. purchase.

As used herein, the term "cost per click (CPC)" refers to the cost in pay-per-click (PPC) marketing, a type of paid marketing where the advertiser has to pay to the affiliate when the user follows a link in the advertiser's advertisement. The advertisement may be one of the sponsored results, for example.

As used herein, the term "social network" generally refers to a network, like Facebook.com and Twitter.com, enabling its users to upload and consume, hence, share contents like messages, audio contents or video contents. Users may provide feedback on the contents by posting comments and sending social signals, like Facebook's Likes.

As used herein, the term "social media marketing (SMM)" generally refers to marketing on social networks, like viral videos.

As used herein, the term "marketplace" generally refers to a network, like Amazon.com and Tmall.com, offering products and services for rent or sale. Typically, a marketplace comprises a plurality of resources, each of which being dedicated to one or more products or services. Thus, a marketplace, for example, may comprise hundreds, thousands or millions of resources.

As used herein, the term "video platform" generally refers to a network, like Youtube.com and Vimeo.com, enabling its users to upload and consume, and, hence, share video contents.

As used herein, the term "app store" generally refers to a network, like Apple's iTunes App Store and Google's Play Store, enabling developers to distribute their software applications for computer devices, for example mobile apps.

As used herein, the term "link building" generally refers to methods aiming to increase the number and quality links on pages pointing to the page or site.

As used herein, the term "search engine optimization (SEO)" generally refers to methods aiming to improve the position of a page or site in the ranked results. The methods include direct on-page optimization amending the page or site itself, and indirect off-page optimization including link building, search engine marketing, social media marketing.

As used herein, the term "contextual network", or content network, generally refers to a subnetwork of related resources in a network, the subnetwork providing services, like search engines, or contents, like social networks, marketplaces, video platforms and app stores. Typically, contextual networks, like Google AdWords and Facebook Ads, place context-specific advertisement across their pages.

As used herein, the term "performance" generally refers to a network-specific resource and its utility, usefulness and, hence, score and ranking. The performance of a target resource may be represented relative to the performance of a field resource.

As used herein, the term "performance metrics" generally refers to a network-specific resource and its metrics. The term keyword-related performance metrics generally refers to a metrics relating to a keyword, like search volume of the keyword and cost-per-click of the keyword. The term traffic-related performance metrics generally refers to a metrics relating to traffic, like traffic volume of the resource and traffic speed of the resource. The term context-related performance metrics generally refers to a metrics relating to a contextual network, like volume of social signals.

As used herein, the term "performance potential", or "potential performance", generally refers to a network-specific resource and its ability to increase its utility and usefulness, and to climb in scores and rankings. Thus, a resource being already at the top of a ranking or most popular has no potential to climb further. The performance potential of a target resource may be represented relative to the performance of a field resource.

For classifying keywords in a network such as the www, a computer such as a server computer coupled to the network may comprise a processor such as microprocessor, configured to perform operations; and a memory such as main memory, coupled to the processor and comprising instructions such as machine instructions. The instructions, when executed in the computer, i.e. by the processor, may cause the operations of crawling the network and acquiring contents from the resources in the network; determining performance metrics, such as keywords, search volumes of the keywords, costs-per-click of the keywords, traffics volumes of the resources, traffic speeds of the resources, context-related performance metrics relating contextual networks such as social networks like Facebook.com and marketplace like Amazon.com, volumes of social signals of the resources, numbers of backlinks to the resources, ratings of the resources, search-engine-optimization values of the resources, and bounce rates and click-through rates, characterizing the resources; and storing the performance metrics in the memory, for example in a data base in the memory.

For classifying keywords in a network such as the www, a computer such as a server computer coupled to the network may comprise a processor such as microprocessor, configured to perform operations; and a memory such as main memory, coupled to the processor and comprising instructions such as machine instructions. The instructions, when executed in the computer, i.e. by the processor, may cause the operations of receiving, for example from a user via a web browser on another computer such as client computer, one or more received topics for resource contents, determining, using the pre-stored performance metrics, one or more candidate topics related to the one or more received topics for the resource contents; in case that one or more topics selectable from the one or more candidate topics, or added from one or more additional topics are received, returning to determining one or more candidate topics; determining, using the pre-stored performance metrics, one or more candidate questions relevant to at least one of the one or more received topics; and receiving one or more questions selectable from the one or more candidate questions; determining, using the pre-stored performance metrics, one or more candidate terms relevant to at least one of the one or more received topics, and one or more received questions; receiving one or more terms selectable from the one or more candidate terms; determining, using the pre-stored performance metrics, a candidate target quantity value for the resource contents based on at least one of the one or more received topics, one or more received questions, and one or more received terms; and generating a brief for the resource contents based on at least one of the one or more received topics, one or more received questions, and one or more received terms.

The instructions may cause the operations of outputting the performance metrics. The performance metrics may be suitably represented, for example, as bar graphs, pie charts, bubble charts, traffic-light rating like red amber green (RAG) rating or any combination thereof. The output may be presented to the user via the web browser on the other computer.

The instructions may cause the operations of classifying the keywords. The keywords may be classified automatically, semi-automatically or manually.

FIG. 1 shows a typical computer network architecture 1 implementing the present invention. The typical computer network architecture 1 may comprise a plurality of client computing devices 10-1, . . . **10-*n*, a plurality of server computing devices 20-1, . . . 20-*n* and a network 30** such as the Internet.

The plurality of client computing devices 10-1, . . . **10-*n* may comprise one or more stationary computing devices 10-1. One or more of the stationary computing devices 10-1 may, for example, comprise a desktop computer 100-1, a display 170-1 coupled to the desktop computer 100-1, an input device 180 such as a keyboard coupled to the desktop computer 100-1 and a pointing device 190 such as a mouse 190, joystick, trackball and touchpad coupled to the desktop computer 100-1. One or more of the stationary computing devices 10-1 may be coupled to the network 30 via a connection such as wire-based connection 40-1. The plurality of client computing devices 10-1, . . . 10-*n* may comprise one or more mobile computing devices 10-2, . . . 100-*n* such as a smart phone 10-2 or a tablet computer 10-*n*. One or more of the mobile computing devices 10-2, . . . 10-*n* may be coupled to the network 30 via a connection such as wireless connection 40-1, 40-*n*. The client computing devices 10-1, . . . 10-*n* may, for example, be implemented by a typical computer device architecture 10 as described with reference to FIG. 2**.

The plurality of server computing devices 20-1, . . . **20-*n* may, for example, comprise one or more tower servers, one or more rack servers, or any combination thereof. One or more of the plurality of server computing devices 20-1, . . . 20-*n* may be coupled to the network 30 via a connection such as wire-based connection 50-1, . . . 50-*n*. The server computing devices 20-1, . . . 20-*n* may, for example, be implemented by a typical computer device architecture 10 as described with reference to FIG. 2**.

The network 30 may comprise one or more hubs, switches, routers and the like. Thus, users of the plurality of client computing devices 10-1, . . . **10-*n* may, for example, access software such as data or programs stored in plurality of server computing devices 20-1, . . . 20-*n* via the network 30**.

Figure 2:
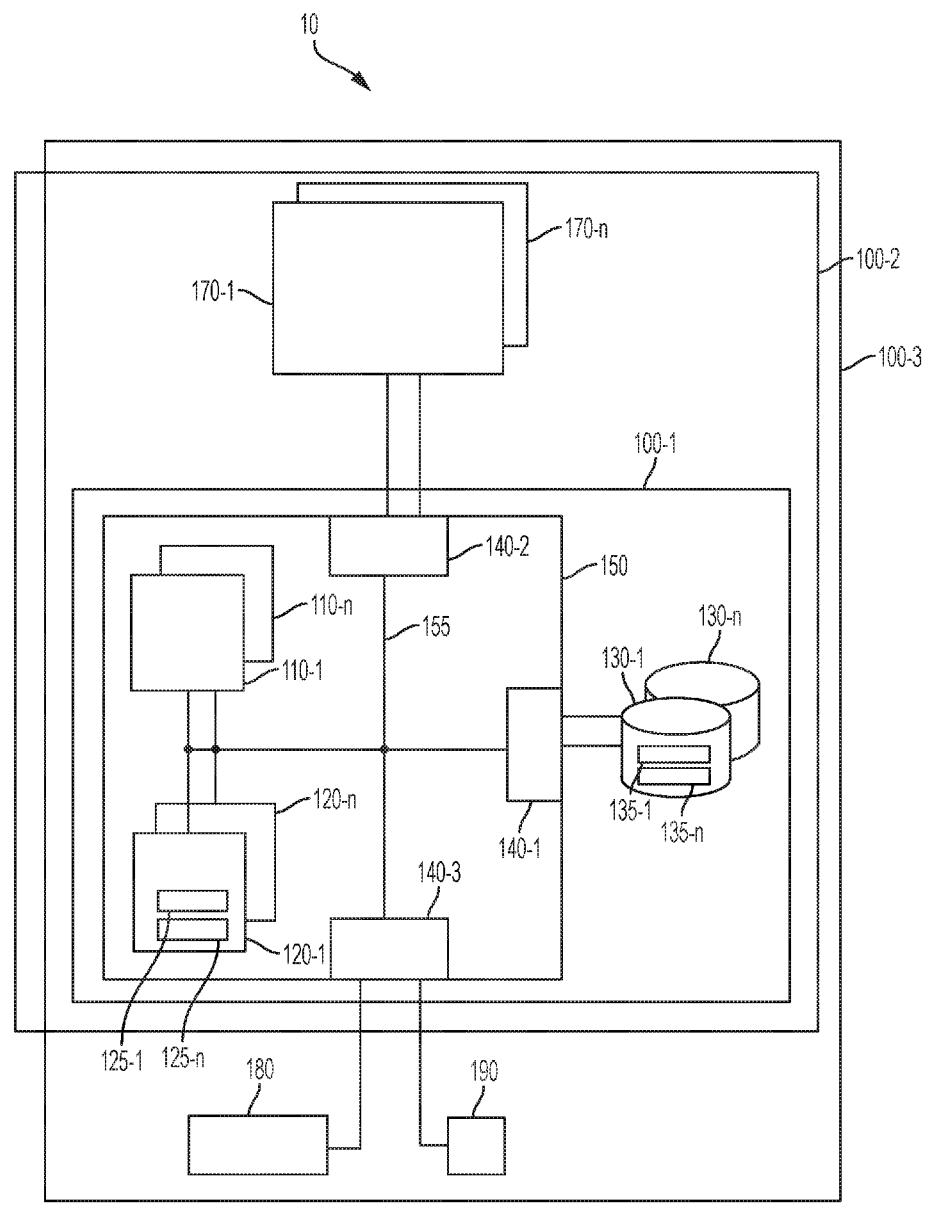
FIG. 2 shows a typical computer device architecture 10 implementing the present invention.

FIG. 2 shows a typical computer device architecture 10 implementing the present invention. The typical computer device architecture 10 may comprise one or more processors 110-1, . . . **110-*n*, one or more memories 120-1, . . . 120-*n* coupled to the one or more processors 110-1, . . . 110-*n*, and one or more interfaces 140-1, . . . 140-3 coupled to the one or more processors 110-1, . . . 110-*n***.

The one or more processors 110-1, . . . **110-*n* may execute instructions of programs, for example, comprise a microprocessor, an application-specific integrated circuit (ASIC), an application-specific instruction set processor (ASIP), a digital signal processor (DSP), a co-processor, or any combination thereof. The one or more processors 110-1, . . . 110-*n* may, for example, comprise a single-core processor, multi-core processor such as quad-core processor, or any combination thereof. The one or more processors 110-1, . . . 110-*n*** may, for example, be implemented by microcontrollers or field programmable gate arrays (FPGAs).

The one or more memories 120-1, . . . **120-*n* may store software items 125-1, . . . 125-*n* such as data or programs likes databases and, for example, comprise volatile memory such as random-access memory (RAM) and static RAM (SRAM), non-volatile memory such as read-only memory (ROM), electrically erasable programmable ROM (EEPROM) and Flash memory, or any combination thereof. The one or more interfaces 140-1, . . . 140-3** may, for example, comprise parallel interfaces, serial interfaces, universal serial bus (USB) interfaces, or any combination thereof.

The one or more processors 110-1, . . . **110-*n*, one or more memories 120-1, . . . 120-*n* and one or more interfaces 140-1, . . . 140-3 may be arranged on a circuit board such as printed circuit board (PCB) 150 comprising connections such as a bus 155 coupling the one or more processors 110-1, . . . 110-*n*, one or more memories 120-1, . . . 120-*n* and one or more interfaces 140-1, . . . 140-3**.

The typical computer device architecture 10 may comprise one or more data storages 130-1, . . . **130-*n* such as hard disk drives (HDDs, hard disks, hard drives), solid-state drives (SSDs), Compact Disc ROM (CD-ROM) drives, or any combination thereof. The one or more data storages 130-1, . . . 130-*n* may store software items 135-1, . . . 135-*n* such as data or programs likes databases. The one or more data storages 130-1, . . . 130-*n* may, for example, comprise fixed data storages, removable data storages, or any combination thereof. The one or more data storages 130-1, . . . 130-*n* may be coupled to the one or more processors 110-1, . . . 110-*n* via a storage interface 140-1 of the one or more interfaces 140-1, . . . 140-3**.

The typical computer device architecture 10 may comprise one or more displays 170-1, . . . **170-*n* such as cathode ray tube (CRT) displays, liquid-crystal displays (LCDs), organic light-emitting diode (OLED) displays, or any combination thereof. The one or more data storages 170-1, . . . 170-*n* may be coupled to the one or more processors 110-1, . . . 110-*n* via a display interface 140-2 of the one or more interfaces 140-1, . . . 140-3**.

The typical computer device architecture 10 may comprise an input device 180 such as a keyboard coupled to the one or more processors 110-1, . . . **110-*n* via a input interface 140-3 of the one or more interfaces 140-1, . . . 140-3. The typical computer device architecture 10 may comprise a pointing device 190 such as a mouse, joystick, trackball and touchpad coupled to the one or more processors 110-1, . . . 110-*n* via the input interface 140-3**.

The desktop computer 100-1, for example, may comprise the one or more processors 110-1, . . . **110-*n*, one or more memories 120-1, . . . 120-*n*, one or more interfaces 140-1, . . . 140-3, PCB 150 and one or more data storages 130-1, . . . 130-*n*. An all-in-one computer 100-2, for example, may comprise the one or more processors 110-1, . . . 110-*n*, one or more memories 120-1, . . . 120-*n*, one or more interfaces 140-1, . . . 140-3, PCB 150, one or more data storages 130-1, . . . 130-*n* and one or more displays 170-1, . . . 170-*n*. A notebook computer 100-3, for example, may comprise the one or more processors 110-1, . . . 110-*n*, one or more memories 120-1, . . . 120-*n*, one or more interfaces 140-1, . . . 140-3, PCB 150, one or more data storages 130-1, . . . 130-*n*, one or more displays 170-1, . . . 170-*n*, input device 180 and pointing device 190. The typical computer device architecture 10** may further comprise a power supply (not shown) such as mains adapter, battery, or any combination thereof.

Figure 3:
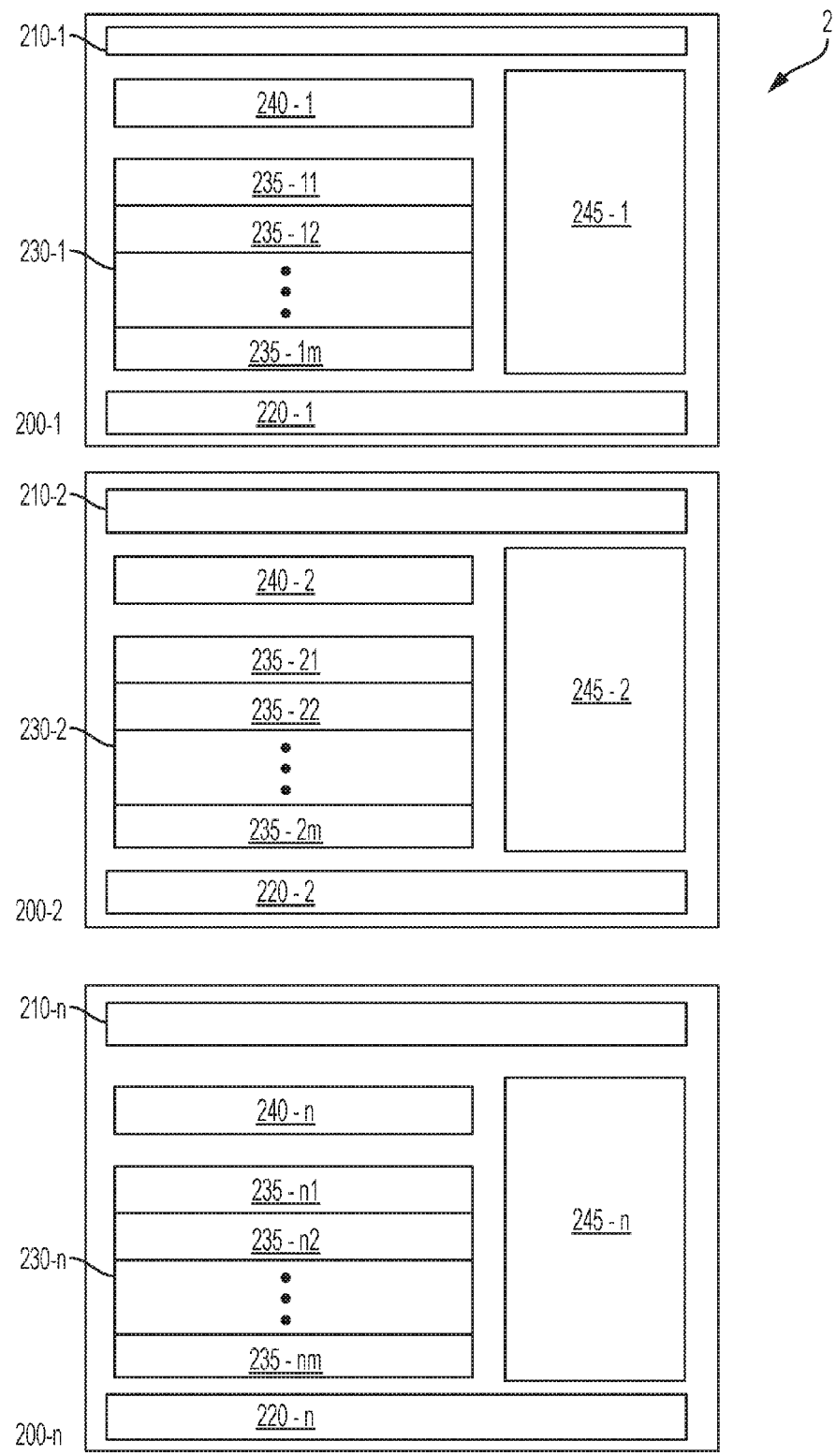
FIG. 3 shows typical search engine results 2 implementing the present invention.

FIG. 3 shows typical search engine results 2 implementing the present invention. The typical search engine results 2 may comprise a plurality of on-screen SERPs 200-1, . . . **200-*n* comprising a first SERP 200-1, a second SERP 200-2 and subsequent SERP 200-*n*** generated by a search engine.

Each of the plurality of SERPs 200-1, . . . **200-*n* may comprise a query section 210-1, . . . 210-*n* for receiving one or more keywords and one or more search instructions from a user. As shown in FIG. 3, the query section 210-1, . . . 210-*n* may be rectangular. It may extend partially or fully across the SERP 200-1, . . . 200-*n*. It may be arranged towards a top margin of the SERP 200-1, . . . 200-*n***.

Each of the plurality of SERPs 200-1, . . . 200-n may comprise a navigation section 220-1, . . . 220-n for receiving navigational instructions from the user, such as a plurality of on-screen buttons each of which being assigned on one of the plurality of SERPs 200-1, . . . 200-n. As shown in FIG. 3, the navigation section 220-1, . . . 220-n may be rectangular. It may extend partially or fully across the SERP 200-1, . . . 200-n. It may be arranged towards a bottom margin of the SERP 200-1, . . . 200-n.

Each of the plurality of SERPs 200-1, . . . 200-n may comprise an organic search result section 230-1, . . . 230-n for displaying one or more organic search results to the user. As shown in FIG. 3, the organic search result section 230-1, . . . 230-n may be rectangular. It may extend partially or fully along the SERP 200-1, . . . 200-n. It may be arranged towards a left margin of the SERP 200-1, . . . 200-n. The organic search result section 230-1, . . . 230-n may comprise a plurality of individual organic search result sections 235-11, . . . 235-1*m*, 235-21, . . . 235-2*m*, 235-n1, . . . 235-nm comprising a first individual organic search result section 235-11, 235-21, . . . 235-n1, a second individual organic search result section 235-12, 235-22, . . . 235-n2, and subsequent individual organic search result sections 235-1*m*, 235-2*m*, 235-nm. The plurality of organic search result sections 230-1, . . . 230-n may have different numbers m of individual organic search result sections 235-11, . . . 235-1*m*, 235-21, . . . 235-2*m*, 235-n1, . . . 235-nm. The search engine may rank the organic search results according to their relevance to the one or more keywords. The search engine may assign to each of the individual organic search result sections 235-11, . . . 235-1*m*, 235-21, . . . 235-2*m*, 235-n1, . . . 235-nm one of the organic search results. Thus, a most relevant organic search result may be assigned to the first individual organic search result section 235-11 on the first SERP 200-1, a second most relevant organic search result may be assigned to the second individual organic search result section 235-12 on the first SERP 200-1, an m-th most relevant organic search result may be assigned to the m-th individual organic search result section 235-1*m* on the first SERP 200-1, an (m+1)-th most relevant organic search result may be assigned to the first individual organic search result section 235-21 on the second SERP 200-2, and so on.

Traffic resulting from searches generally divides into, on the first SERP 200-1, 10% for the most relevant organic search result, 8% for the second most relevant organic search result, 6% for the third most relevant organic search result, 3% for the fourth most relevant organic search result, . . . 0.5% for the tenth most relevant organic search result, on the second SERP 200-2, 0.05% for the eleventh most relevant organic search result.

Performance potentials are generally, on the first SERP 200-1, 0% for both the most relevant organic search result and the second most relevant organic search result, in case of a navigational keyword 0% or in case of a transactional or informational keyword 10% for both the third and fourth most relevant organic search results, 15% for both the fifth and sixth most relevant organic search results, 25% for each of the seventh, eighth, ninth and tenth most relevant organic search results, and on the second SERP 200-2, 500% for both the eleventh and twelfth organic search results, i.e. a move from the second SERP 200-2 to the first SERP 200-1.

Each of the plurality of SERPs 200-1, . . . 200-n may comprise one more sponsored search result sections 240-1, . . . 240-n for displaying one or more sponsored search results to the user. As shown in FIG. 3, the sponsored search result sections 240-1, . . . 240-n may be rectangular. They may extend partially or fully along the SERP 200-1, . . . 200-n. As shown in FIG. 3, the search result sections 240-1, . . . 240-n may be arranged towards the left margin of the SERP 200-1, . . . 200-n, or the right margin, for example.

Each of the plurality of SERPs 200-1, . . . 200-n may comprise one or more integration sections 245-1, . . . 245-n for displaying one or more search engine integrations, i.e. additional contents compiled and/or provided by the search engine, to the user. As shown in FIG. 3, the integration sections 245-1, . . . 245-n may be rectangular. They may extend partially or fully along the SERP 200-1, . . . 200-n. As shown in FIG. 3, the integration sections 245-1, . . . 245-n may be arranged towards the right margin of the SERP 200-1, . . . 200-n, or the left margin, for example.

Figure 4:
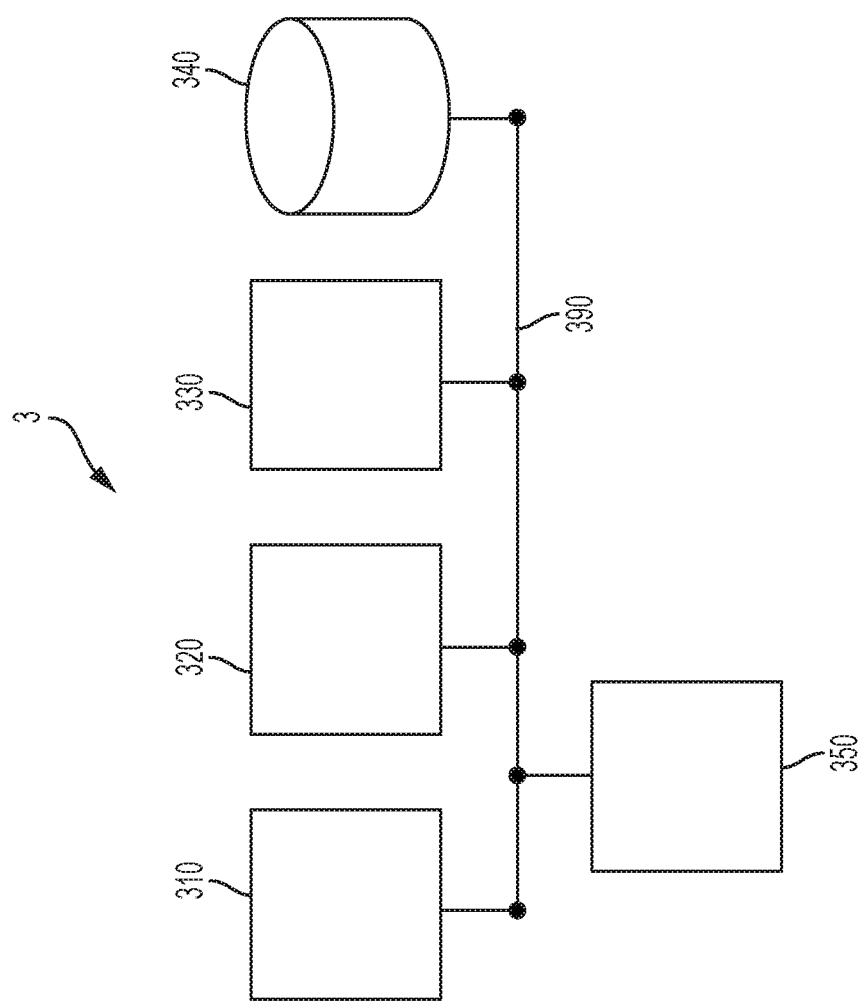
FIG. 4 shows a keyword classification architecture 3 implementing the present invention.

FIG. 4 shows a keyword classification architecture 3 implementing the present invention. The keyword classification architecture 3 may, for example, be implemented in a stand-alone keyword classification system, a content management system (CMS) or research tool, such as online research tool. The keyword classification architecture 3 may comprise a plurality of modules such as software modules, hardware modules, or any combination thereof. The plurality of modules may be executed on the one or more computing devices 10 such as server computing devices 20-1, . . . 20-n, or provided as a service, that may be implemented as a cloud service. The software modules may comprise programs such as machine code, or compiled or interpreted code. The hardware modules may comprise dedicated hardware such as ASICs and FPGAs. Two or more modules of plurality of modules may be coupled to each other via one or more connections such as a module bus 390.

The keyword classification architecture 3 may comprise a category module 310. The category module 310 may automatically acquire a set of categories from one or more resources in the network. The set of categories may be a partially ordered set. The categories may, for example, be Wikipedia categories and be acquired from Wikidata.org.

The keyword classification architecture 3 may comprise a resource contents module 320. The resource contents module 320 may automatically acquire a plurality of resources. The resources may, for example, be Wikipedia articles and be acquired from Wikipedia.org, or an open repository of web crawl data such as CommonCrawl.org. Each of the plurality of resources may be classified into one or more categories of the set of categories. Each of the plurality of resources may comprise a resource title and resource corpus.

The keyword classification architecture 3 may comprise a search results module 330. The search results module 330 may automatically acquire pluralities of search results. The pluralities of search results may be acquired from a search engine such as Google.com. Each of the pluralities of search results may be related to one of a plurality of keywords. Each search result of the pluralities of search results may indicate a related resource in the network. The search results module 330 may extract, for each of the pluralities of search results, a plurality of most relevant organic search results. The plurality of most relevant organic search results may comprise between 1 and 100, or 10 organic search results. The search results module 330 may extract, for each search result of the pluralities of search results, one or more terms relevant to the related resource. The one or more terms relevant to the related resource may be extracted using TF-IDF. The search results module 330 may remove, for each search result of the pluralities of search results, one or more terms irrelevant to the related resource. Irrelevant terms may comprise common terms such as "a", "the", "be" and "and" and/or general terms such as "Wikipedia". The one or more terms irrelevant to the related resource may be extracted using TF-IDF. Each search result of the pluralities of search results may comprise a search result title.

The keyword classification architecture 3 may comprise a data base module 340. The data base module 340 may automatically store the set of categories, plurality of resources and pluralities of search results as pre-stored set of categories, plurality of resources and pluralities of search results, respectively. The data base module could store millions of keywords, for example 800.000.000 keywords.

The keyword classification architecture 3 may comprise a classification module 350. The classification module 350 may identify a plurality of candidate categories, process the plurality of candidate categories; and classify the keyword by selecting the candidate category having a highest similarity value within a plurality of similarity values.

Identifying the plurality of candidate categories may comprise converting a plurality of search results related to the keyword into a plurality of search vectors. Each of the plurality of search results may indicate a related resource in the network. Identifying the plurality of candidate categories may comprise converting a plurality of resources into a plurality of category vectors. Each of the plurality of resources may be classified in one or more category of a set of categories. The search vectors and/or category vectors may have between 10 and 10000, 100 and 1000, or 200 and 500 dimensions. Identifying the plurality of candidate categories may comprise determining, for the plurality of category vectors, a plurality of similarity values indicating similarity to the plurality of search vectors. Determining the plurality of similarity values may comprise determining cosine similarities between each of the plurality of category vectors and each of the plurality of search vectors. Identifying the plurality of candidate categories may comprise extracting, for each of the plurality of search results or plurality of resources, one or more terms relevant to the related resource. Identifying the plurality of candidate categories may comprise removing, for each of the plurality of search results or plurality of resources, one or more terms irrelevant to the related resource. Identifying the plurality of candidate categories may comprise producing word embeddings using a Word2Vec model, such as continuous bag-of-words model or continuous skip-gram model. Identifying the plurality of candidate categories may comprise reducing dimensionality of the vectors of the plurality of search vectors or resource vectors using nonlinear dimensionality reduction such as t-distributed stochastic neighbor embedding. Identifying the plurality of candidate categories may comprise selecting, for the plurality of search result, a pre-determined number of search results or per search result, a pre-determined number of candidate categories having higher similarity values within the plurality of similarity values. For example, only between 100 and 500, or 200 candidate categories having higher similarity may be selected per search result; only candidate categories being related to between 2 and 5, or 3 out of 10 search results may be selected; and/or only between 10 and 1000, or 100 candidate categories having higher similarity may be selected for the plurality of search result.

The plurality of categories may comprise related categories such as grandparent, parent, child and grandchild categories. In case that a candidate category is a descendant category of another candidate category, processing the plurality of candidate categories may comprise transferring its similarity value to the other candidate category. In case that two or more candidate categories share a common ancestor category, processing the plurality of candidate categories may comprise transferring their similarity values to their common ancestor category.

Classifying the keyword may comprise determining cosine similarity between the candidate category and the keyword. Classifying the keyword may comprise using long short-term memory.

A user, for example content strategist, content marketing manager, online marketing manager, editor, chief editor, freelancer, writer or owner of a small business, of the client computing device may have a keyword, or even a large plurality of keywords, automatically classified. The classification may be based on pre-processed, i.e. pre-acquired and pre-stored, information. Thus, the keyword classification architecture 3 may classify the keyword, or search query, while the user is managing resource contents, i.e. in real time.

Figure 5:
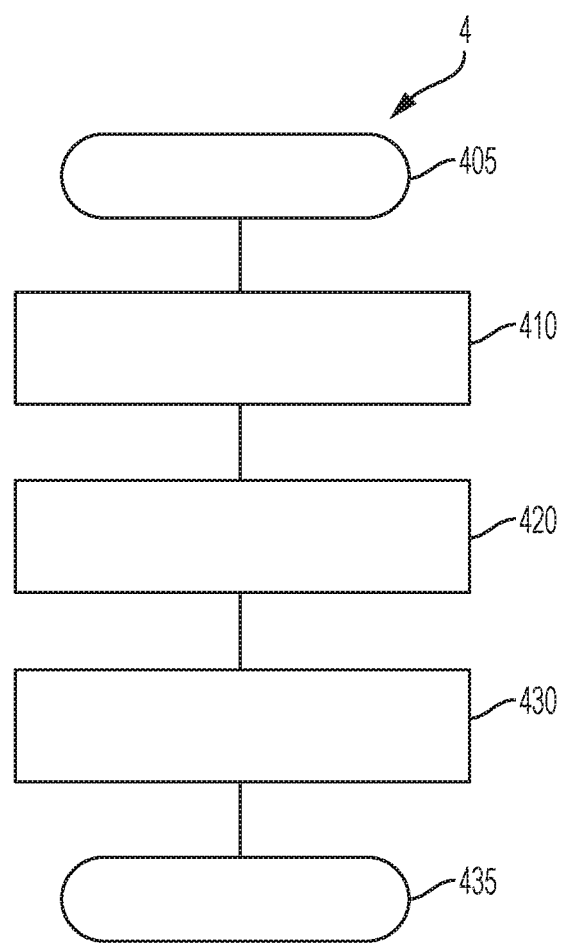
FIG. 5 shows a flow chart of a pre-process 4 for classifying keywords in a network according to an embodiment of the present invention.

FIG. 5 shows a flow chart of a pre-process 4 for classifying keywords in a network according to an embodiment of the present invention. The pre-process 4 may obtain a set of categories and a plurality of resources, each of which being classified in one or more categories of the set of categories, and store same for subsequent classification of the keywords in the network.

The pre-process 4 for classifying the keyword in the network starts at step 405.

Following step 405, the pre-process 4 comprises step 410. In step 410, the pre-process 4 may automatically crawl the network and acquire resource contents from one or more resources in the network.

Following step 410, the pre-process 4 comprises step 420. In step 420, the pre-process 4 may automatically determine performance metrics characterizing each of one or more resources of the crawled network.

Following step 420, the pre-process 4 comprises step 430. In step 410, the pre-process 4 may automatically store the determined performance metrics as pre-stored performance metrics.

The pre-process 4 for classifying the keyword in the network ends at step 435.

Figure 6:
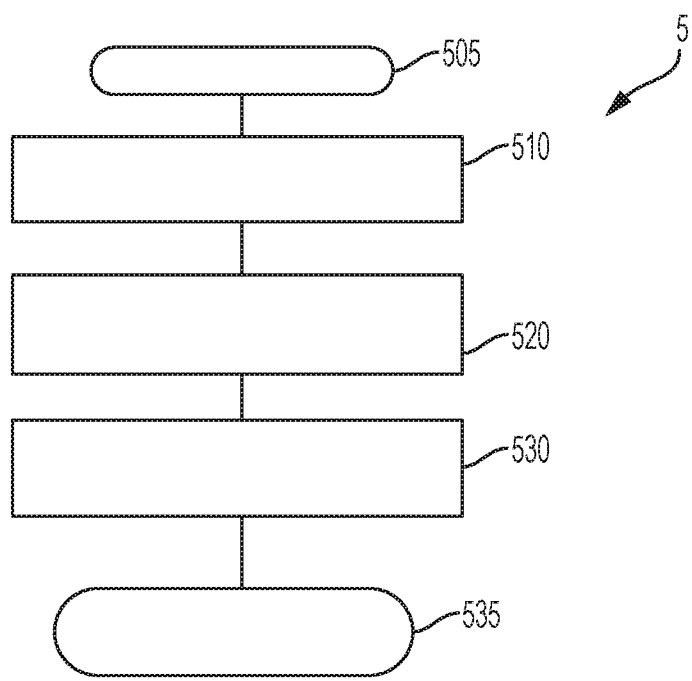
FIG. 6 shows a simplified flow chart of a process 5 for classifying keywords in a network according to an embodiment of the present invention.

FIG. 6 shows a simplified flow chart of a process 5 for classifying keywords in a network according to an embodiment of the present invention.

The process 5 for classifying keywords in the network starts at step 510. In step 510, the process 5 may require user authentication from a user. The user authentication may be implemented as single-factor authentication, two-factor authentication or multi-factor authentication, for example. The process 5 may comprise identifying the plurality of candidate categories. Identifying a plurality of candidate categories may comprise converting a plurality of search results related to the keyword into a plurality of search vectors, wherein each of the plurality of search results may indicate a related resource in the network. Identifying a plurality of candidate categories may comprise converting a plurality of resources into a plurality of category vectors, wherein each of the plurality of resources may be classified in one or more categories of a set of categories. Identifying a plurality of candidate categories may comprise determining, for the plurality of category vectors, a plurality of similarity values indicating similarity to the plurality of search vectors. Determining the plurality of similarity values may comprise determining cosine similarities between each of the plurality of category vectors and each of the plurality of search vectors. Identifying a plurality of candidate categories may comprise extracting, for each of the plurality of search results or plurality of resources, one or more terms relevant to the related resource. Identifying a plurality of candidate categories may comprise removing, for each of the plurality of search results or plurality of resources, one or more terms irrelevant to the related resource. Identifying a plurality of candidate categories may comprise producing word embeddings using, for example, a Word2Vec model, such as continuous bag-of-words model or continuous skip-gram model. Identifying a plurality of candidate categories may comprise reducing dimensionality of the vectors of the plurality of search vectors or resource vectors using, for example, nonlinear dimensionality reduction or t-distributed stochastic neighbor embedding. Identifying a plurality of candidate categories may comprise selecting, for the plurality of search result, a pre-determined number of search results or per search result, a pre-determined number of candidate categories having higher similarity values within the plurality of similarity values.

Following step 510, the process 5 comprises step 520. In step 520, the process 5 may comprise processing the plurality of candidate categories. The plurality of categories may comprise related categories. Processing the plurality of candidate categories comprises, in case that a candidate category is a descendant category of another candidate category, transferring its similarity value to the other candidate category; or, in case that two or more candidate categories share a common ancestor category, transferring their similarity values to their common ancestor category.

Following step 520, the process 5 comprises step 530. In step 530, the process 5 may comprise classifying the keyword by selecting the candidate category having a highest similarity value within the plurality of similarity values. Classifying the keyword may comprise determining cosine similarity between the candidate category and the keyword. Classifying the keyword may comprise using long short-term memory.

The process 5 for classifying keywords in the network ends at step 535.

Figure 7:
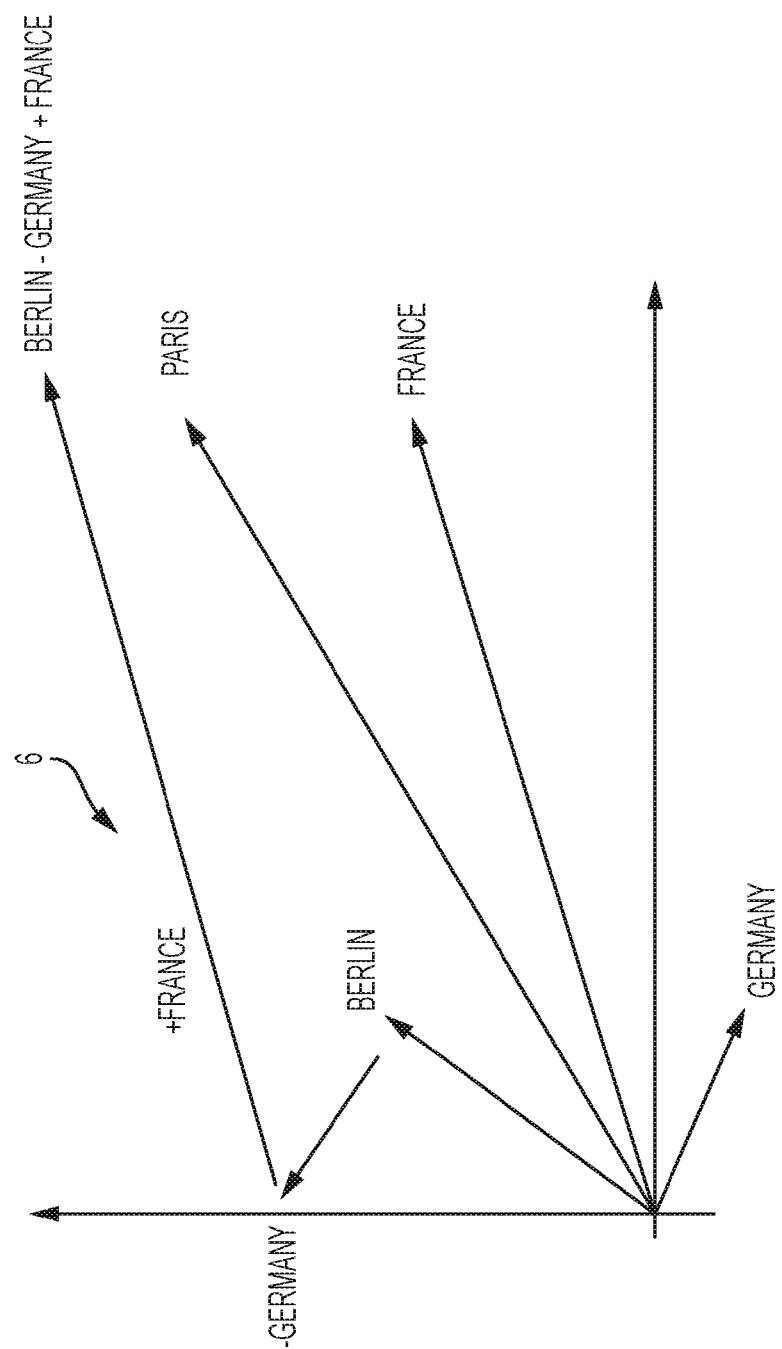
FIG. 7 shows a simplified vector representation 6 of exemplary keywords according to an embodiment of the present invention.

FIG. 7 shows a simplified vector representation 6 of exemplary keywords according to an embodiment of the present invention.

The simplified vector representation 6 visualizes the exemplary keywords. The exemplary keywords comprise "France" designating a country in Western Europe, "Germany" designating another country in Western Europe, "Paris" designating the capital of the country "France", and "Berlin" designating the capital of the other country "Germany". Vectors "France", "Germany", "Paris" and "Berlin" corresponding to the exemplary keywords start at an origin in a high-dimensional vector space. Using vector calculation such as addition and subtraction, visualized by translation, the vector "Berlin" minus the vector "Germany" plus the vector "France" may be determined. The result is similar to the vector "Paris". Results of corresponding calculations, or paths, such as the vector "France" minus the vector "Germany" plus the vector "Berlin", or the vector "France" plus the vector "Berlin" minus the vector "Germany" are also similar to the vector "Paris".

Figure 8:
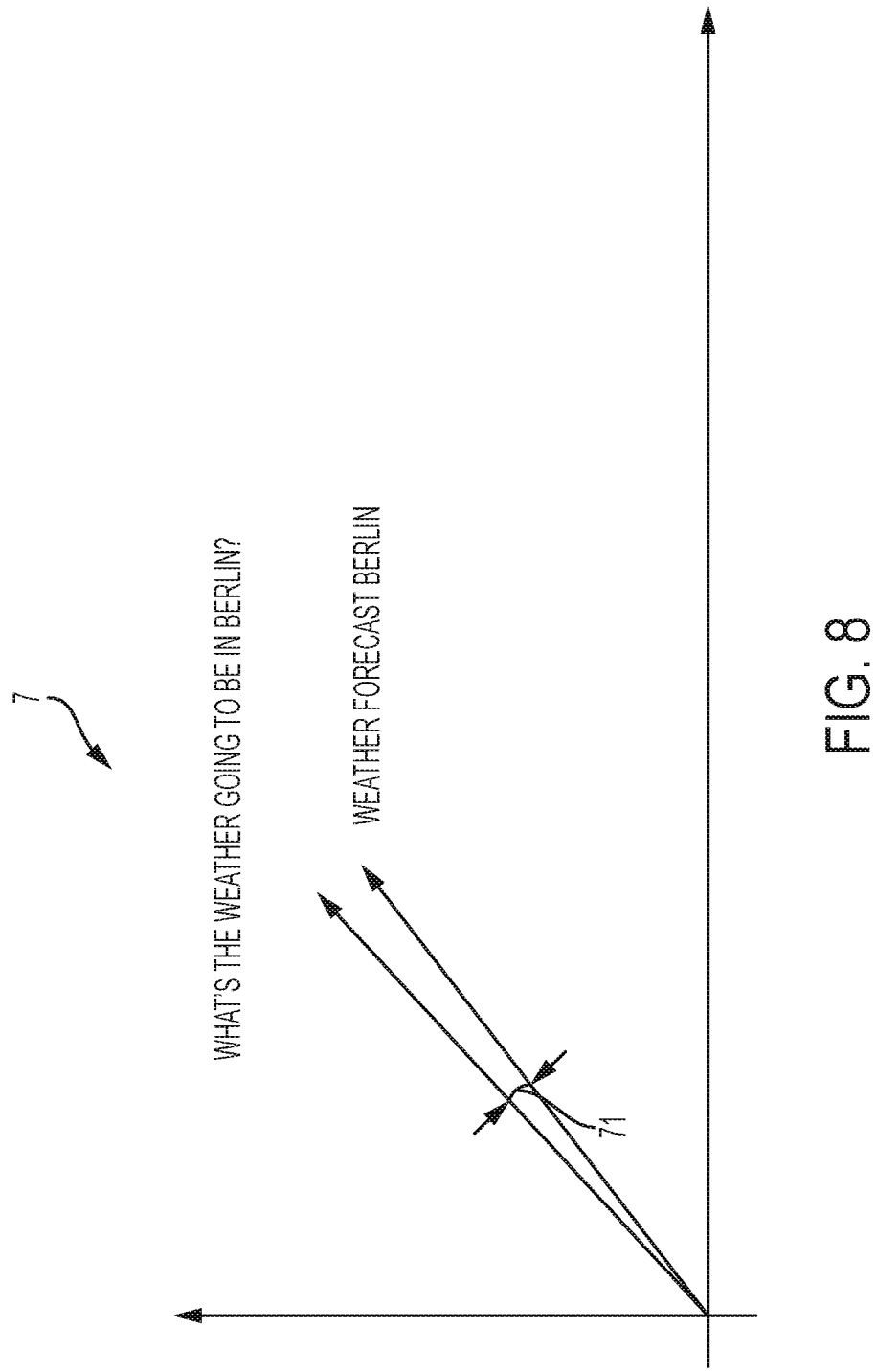
FIGS. 8 and 9 show simplified vector representations 7, 8 of exemplary search queries according to an embodiment of the present invention.
Figure 9:
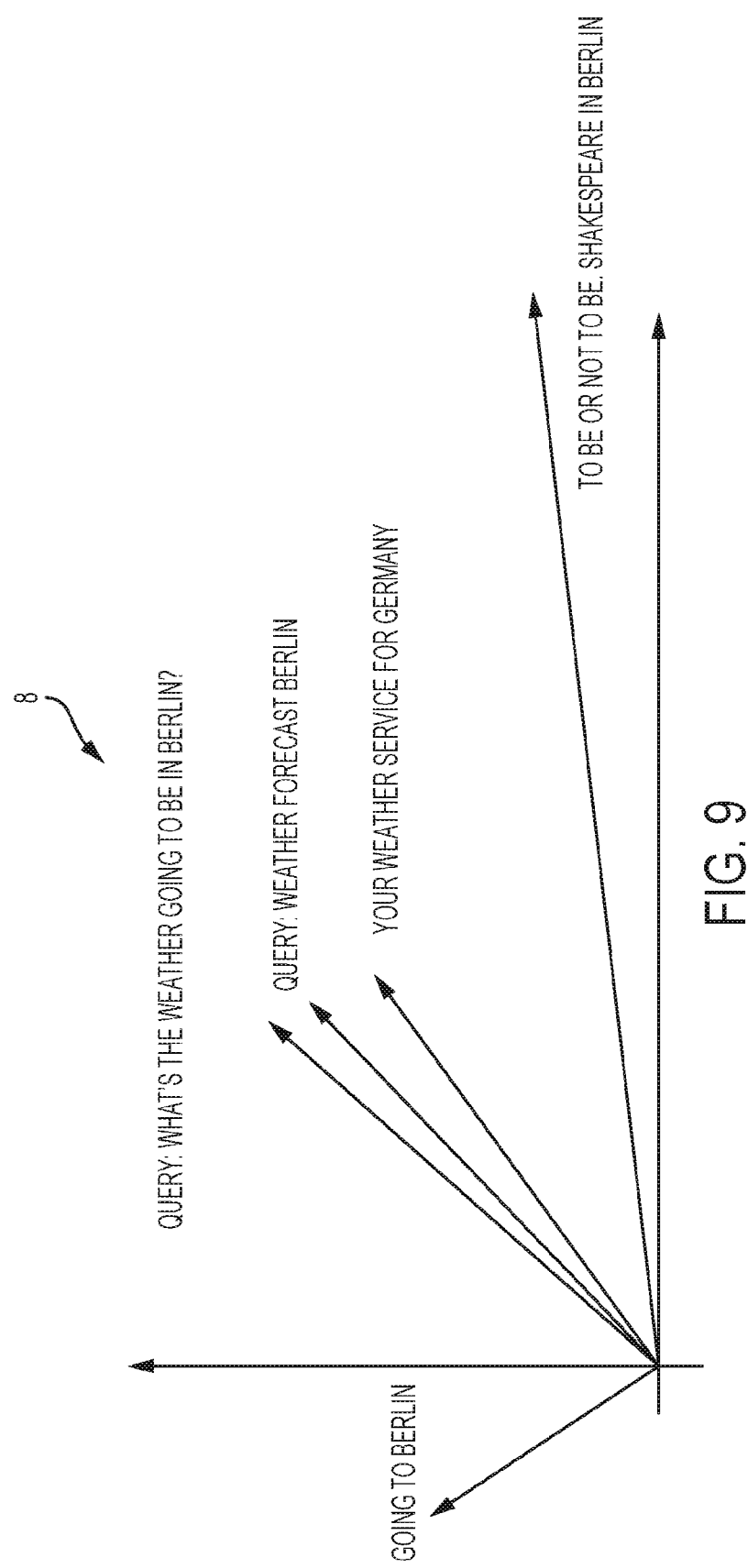
Figure 10:
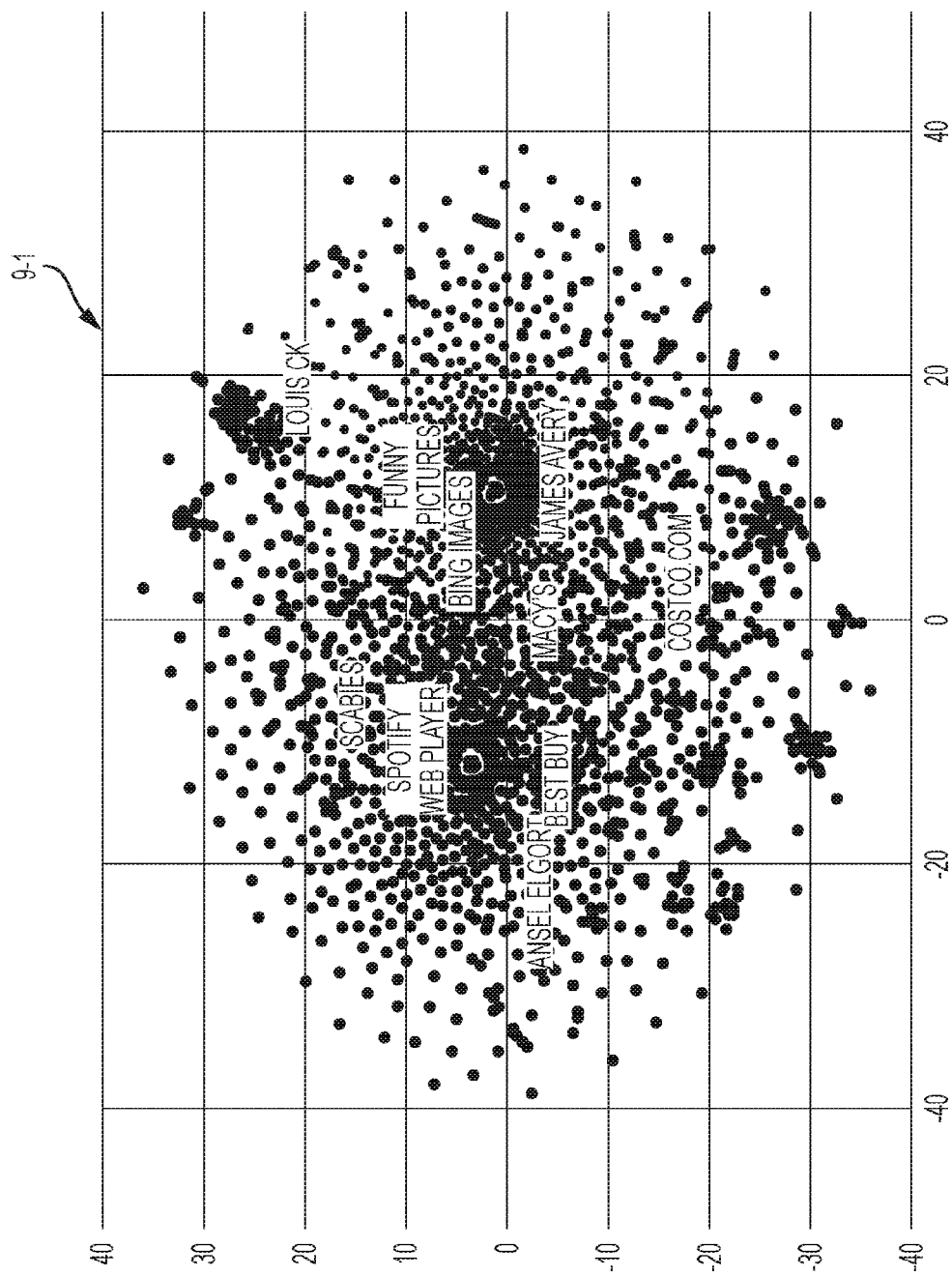
FIGS. 10 to 14 show views 9-1, 9-2, 9-3, 9-4 and 9-5, respectively, of an exemplary visualization of exemplary search queries according to an embodiment of the present invention.
Figure 11:
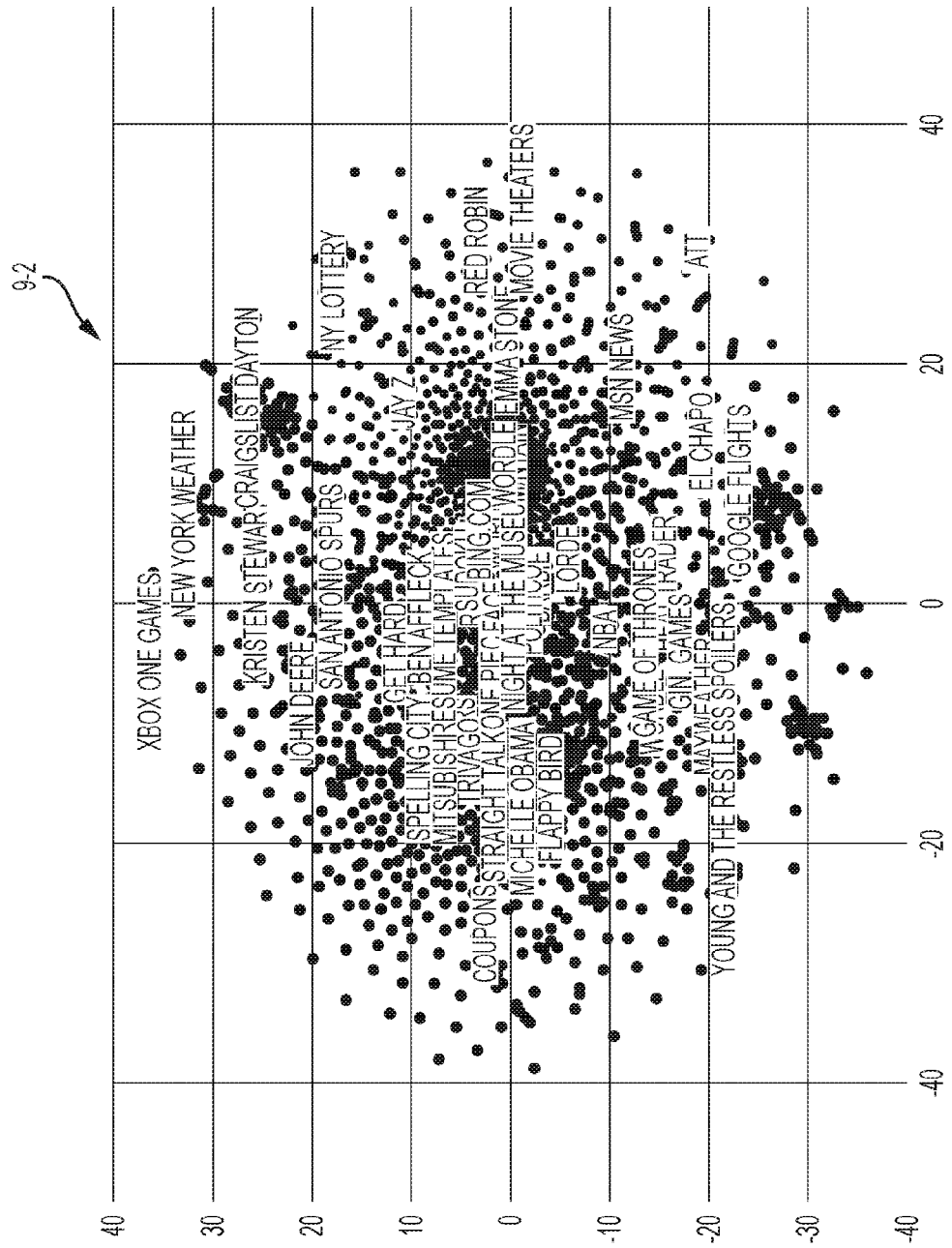
Figure 12:
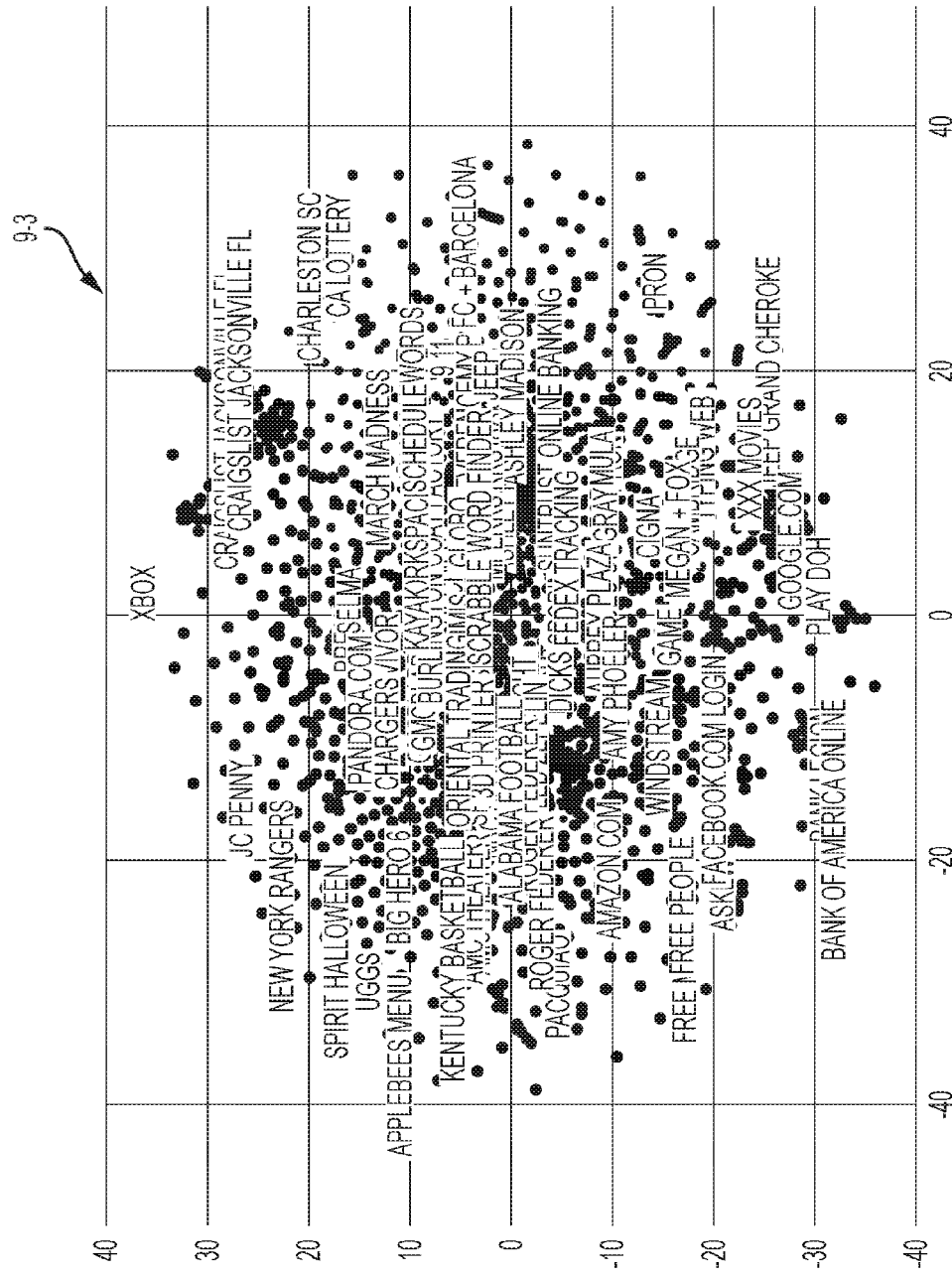
Figure 13:
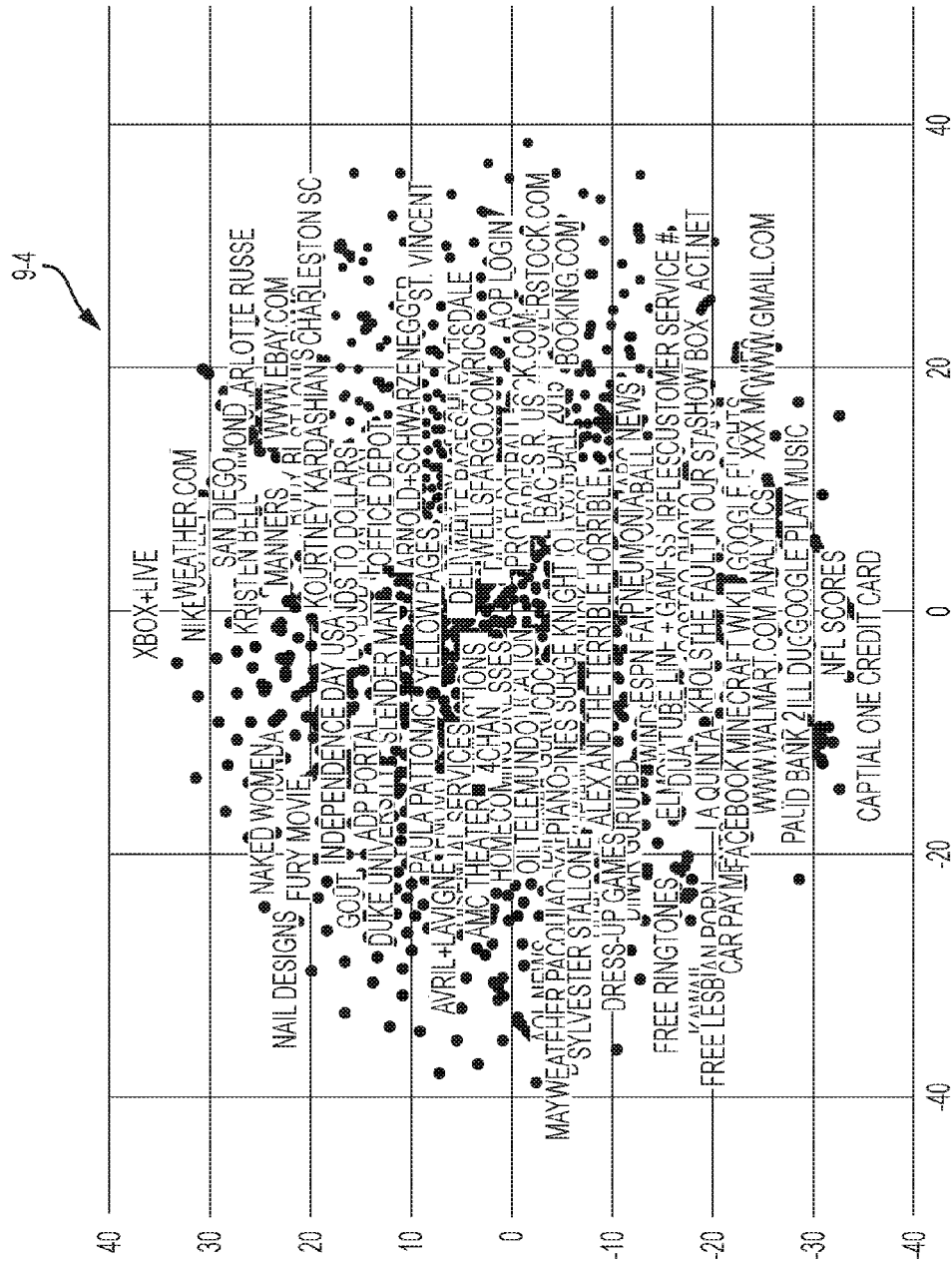
Figure 14:
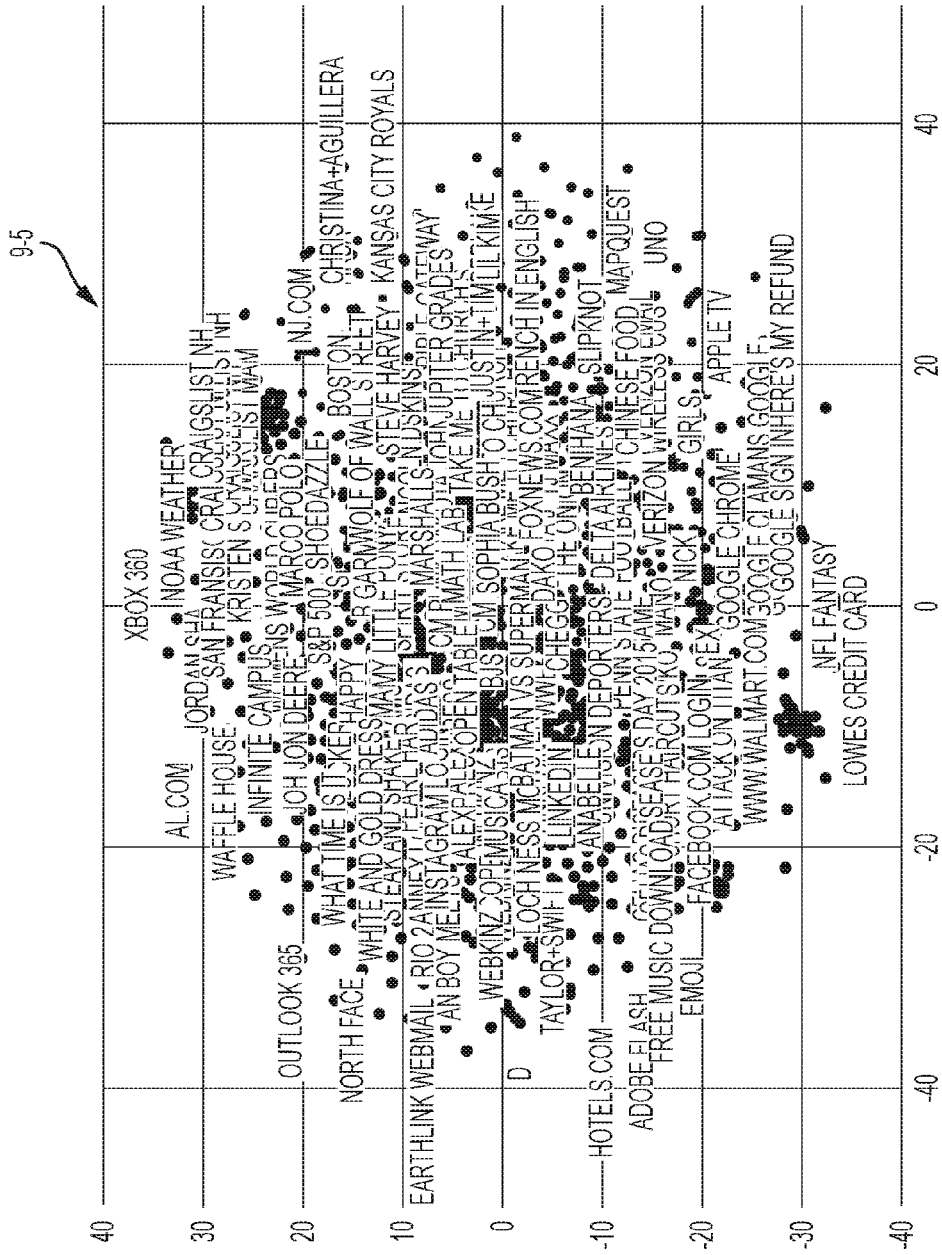

FIGS. 8 and 9 show simplified vector representations 7, 8 of exemplary search queries according to an embodiment of the present invention.

In FIG. 8, the simplified vector representation 7 visualizes the exemplary search queries. The exemplary search queries comprise "weather forecast Berlin" and "what's the weather going to be in Berlin". Vectors "weather forecast Berlin" and "what's the weather going to be in Berlin" corresponding to the exemplary search queries start at an origin in a high-dimensional vector space. The vectors draw an angle 71.

Using cosine similarity, similarity between the vectors, and thus the search queries, may be determined. As shown in FIG. 8, the angle 71 is small. Thus, the cosine is close to 1, indicating that the search queries are similar to each other.

In FIG. 9, the simplified vector representation 9 visualizes the exemplary search queries. The exemplary search queries comprise "to be or not to be, Shakespeare in Berlin", "your weather service for Germany", "query: weather forecast Berlin", "query: what's the weather going to be in Berlin". As described with reference to FIG. 8, vectors corresponding to the exemplary search queries start at an origin in a high-dimensional vector space. As shown in FIG. 9, vectors, and thus search queries, relating to "Germany" and "Berlin" designating the capital of "Germany" are similar to each other, whereas vectors relating to visiting Berlin and a play of the English playwright William Shakespeare in Berlin are dissimilar thereto.

FIGS. 10 to 14 show several views 9-1, 9-2, 9-3, 9-4 and 9-5, respectively, of an exemplary visualization of exemplary search queries according to an embodiment of the present invention.

The exemplary visualization visualizes a plurality of exemplary search queries in a two-dimensional scatter plot using t-SNE. The plurality of variables, or dimensions, is reduced to a set of principal variables. For reasons of legibility and clarity, labels of the exemplary search queries on the exemplary visualization have been distributed over the several views 9-1, 9-2, 9-3, 9-4 and 9-5.

The embodiments described herein are exemplary and explanatory, and are not restrictive of the invention as defined in the claims.

The invention claimed is:

1. A computer-implemented method of classifying a keyword in a network, the method comprising:
    acquiring resource contents from a plurality of resources in the network based on at least one search of the keyword, wherein the at least one search generates a plurality of search results related to the keyword;
    determining performance metrics for each of the plurality of resources in the network;
    with a classification module, executing on one or more computing devices, automatically:
        identifying a plurality of candidate categories, comprising:
            converting the plurality of search results related to the keyword into a plurality of search vectors, wherein each of the plurality of search results indicates a related resource of the plurality of resources in the network;
            converting the plurality of resources into a plurality of category vectors, wherein each of the plurality of resources is classified in one or more categories of a set of categories;
            determining, for the plurality of category vectors, a plurality of similarity values indicating similarity to the plurality of search vectors by determining cosine similarities between each of the plurality of category vectors and each of the plurality of search vectors;
            extracting, for each of the plurality of search results or plurality of resources, one or more terms relevant to the related resource;
            removing, for each of the plurality of search results or plurality of resources, one or more terms irrelevant to the related resource;

producing word embeddings using a Word2Vec model, continuous bag-of-words model or continuous skip-gram model;
reducing dimensionality of the vectors of the plurality of search vectors or resource vectors using nonlinear dimensionality reduction or t-distributed stochastic neighbor embedding; and
selecting, for the plurality of search result, a pre-determined number of search results or per search result, a pre-determined number of candidate categories having higher similarity values within the plurality of similarity values;
processing the plurality of candidate categories; and
classifying the keyword by selecting the candidate category having a highest similarity value within the plurality of similarity values by determining a keyword cosine similarity between the candidate category and the keyword.

2. The method of claim 1, wherein:
the plurality of categories comprises related categories; and
processing the plurality of candidate categories comprises:
in case that a candidate category is a descendant category of another candidate category, transferring its similarity value to the other candidate category; or
in case that two or more candidate categories share a common ancestor category, transferring their similarity values to their common ancestor category.

3. The method of claim 1, wherein:
classifying the keyword comprises:
using long short-term memory.

4. The method of claim 1, further comprising:
with a category module, executing on one or more computing devices, automatically:
obtaining the set of categories; and
storing the set of categories.

5. The method of claim 4, wherein:
the set of categories is a partially ordered set.

6. The method of claim 4, further comprising:
with a resource contents module, executing on one or more computing devices, automatically:
obtaining the plurality of resources; and
storing the plurality of resources.

7. The method of claim 6, wherein:
each of the plurality of resources comprises:
a resource title; and
a resource corpus.

8. The method of claim 1, further comprising:
with a search results module, executing on one or more computing devices, automatically:
obtaining, from the network, pluralities of search results, wherein each of the pluralities of search results is related to one of a plurality of keywords, and each search result of the pluralities of search results indicates a related resource in the network; and
storing the pluralities of search results;
wherein:
the keyword is one of the plurality of keywords; and
the plurality of search results is one of the pluralities of search results.

9. The method of claim 8, wherein:
obtaining the pluralities of search results comprises:
extracting, for each of the pluralities of search results, a plurality of most relevant organic search results;
extracting, for each search result of the pluralities of search results, one or more terms relevant to the related resource; or
removing, for each search result of the pluralities of search results, one or more terms irrelevant to the related resource; or
each search result of the pluralities of search results comprises:
a search result title.

10. A system for classifying a keyword, the system comprising:
one or more processors, when executing on one or more computing devices:
being suitable for performing the method of claim 1.

11. A computing device for classifying a keyword, the computing device comprising:
one or more processors, configured to perform operations; and
a memory, coupled to the one or more processors and comprising instructions to cause, when executing on the one or more processors, the computing device to perform operations, comprising:
acquiring resource contents from a plurality of resources in the network based on at least one search of the keyword, wherein the at least one search generates a plurality of search results related to the keyword;
determining performance metrics for each of the plurality of resources in the network;
identifying a plurality of candidate categories, comprising:
converting the plurality of search results related to the keyword into a plurality of search vectors, wherein each of the plurality of search results indicates a related resource of the plurality of resources in the network;
converting the plurality of resources into a plurality of category vectors, wherein each of the plurality of resources is classified in one or more categories of a set of categories; and
determining, for the plurality of category vectors, a plurality of similarity values indicating similarity to the plurality of search vectors by determining cosine similarities between each of the plurality of category vectors and each of the plurality of search vectors;
processing the plurality of candidate categories;
classifying the keyword by selecting the candidate category having a highest similarity value within the plurality of similarity values by determining a keyword cosine similarity between the candidate category and the keyword;
extracting, for each of the plurality of search results or plurality of resources, one or more terms relevant to the related resource;
removing, for each of the plurality of search results or plurality of resources, one or more terms irrelevant to the related resource;
producing word embeddings using a Word2Vec model, continuous bag-of-words model or continuous skip-gram model;
reducing dimensionality of the vectors of the plurality of search vectors or resource vectors using nonlinear dimensionality reduction or t-distributed stochastic neighbor embedding; and selecting, for the plurality of search result, a pre-determined number of search results or per search result, a pre-determined number of candidate categories having higher similarity values within the plurality of similarity values.

12. The computing device of claim 11, wherein:
the plurality of categories comprises related categories; and
the memory further comprises instructions to cause the computing device,
when processing the plurality of candidate categories, to perform further operations, comprising:
in case that a candidate category is a descendant category of another candidate category, transferring its similarity value to the other candidate category; or
in case that two or more candidate categories share a common ancestor category, transferring their similarity values to their common ancestor category.

13. The computing device of claim 11, wherein:
the memory further comprises instructions to cause the computing device, when classifying the keyword, to perform further operations, comprising:
using long short-term memory.

14. The computing device of claim 11, further comprising:
the memory further comprises instructions to cause the computing device to perform further operations, comprising:
obtaining the set of categories; and
storing the set of categories.

15. The computing device of claim 14, wherein:
the set of categories is a partially ordered set.

16. The computing device of claim 14, further comprising:
the memory further comprises instructions to cause the computing device to perform further operations, comprising:
obtaining the plurality of resources; and
storing the plurality of resources.

17. The computing device of claim 16, wherein:
each of the plurality of resources comprises:
a resource title; and
a resource corpus.

18. The computing device of claim 11, further comprising:
the memory further comprises instructions to cause the computing device to perform further operations, comprising:
obtaining, from the network, pluralities of search results, wherein each of the pluralities of search results is related to one of a plurality of keywords, and each search result of the pluralities of search results indicates a related resource in the network; and
storing the pluralities of search results; wherein:
the keyword is one of the plurality of keywords; and
the plurality of search results is one of the pluralities of search results.

19. The computing device of claim 18, wherein:
the memory further comprises instructions to cause the computing device, when obtaining the pluralities of search results, to perform further operations, comprising:
extracting, for each of the pluralities of search results, a plurality of most relevant organic search results;
extracting, for each search result of the pluralities of search results, one or more terms relevant to the related resource; or
removing, for each search result of the pluralities of search results, one or more terms irrelevant to the related resource; or
each search result of the pluralities of search results comprises:
a search result title.

20. A non-transitory computer-readable storage medium comprising instructions causing a system to perform operations for classifying a keyword, the operations being suitable for performing the method of claim 1.

* * * * *